(12) United States Patent
Okaniwa et al.

(10) Patent No.: US 6,455,209 B1
(45) Date of Patent: Sep. 24, 2002

(54) COLOR FILTER MANUFACTURING METHOD, COLOR FILTER AND LIQUID CRYSTAL DISPLAYER

(75) Inventors: Kenichiro Okaniwa, Hino (JP); Shozo Kikukawa, Hino (JP); Takeshi Murakami, Hino (JP); Masaharu Nonaka, Hino (JP)

(73) Assignee: Konica Corporation (JP)

( * ) Notice: Subject to any disclaimer, the term of this patent is extended or adjusted under 35 U.S.C. 154(b) by 109 days.

(21) Appl. No.: 09/649,735

(22) Filed: Aug. 28, 2000

(30) Foreign Application Priority Data

Aug. 31, 1999 (JP) ............................. 11-245512
Dec. 16, 1999 (JP) ............................. 11-357503
Feb. 28, 2000 (JP) ......................... 2000-051763

(51) Int. Cl.⁷ ..................... G02B 5/20; G02F 1/1335
(52) U.S. Cl. ...................... 430/7; 347/106; 347/107; 349/106
(58) Field of Search ..................... 430/7; 347/106, 347/107; 34/106

(56) References Cited

FOREIGN PATENT DOCUMENTS

| JP | 9-127327 | * | 5/1997 |
| JP | 10-268126 | * | 9/1998 |

* cited by examiner

*Primary Examiner*—John A. McPherson
(74) *Attorney, Agent, or Firm*—Bierman, Muserlian and Lucas (57) ABSTRACT

A method of manufacturing a color filter having a substrate comprising black matrix sections and image forming sections, comprises a step of applying a treatment onto the substrate so as to provide influence to a contact angle between an ink meniscus and the black matrix sections before applying an ink onto the substrate.

44 Claims, 3 Drawing Sheets

FIG. 1

COLOR FILTER MANUFACTURING METHOD, COLOR FILTER AND LIQUID CRYSTAL DISPLAYER

BACKGROUND OF THE INVENTION

The present invention relates to a liquid crystal display employed in color liquid crystal displays, color video cameras, image scanners, personal computers, and the like, and a color filter, and a production method of the same.

In recent years, along with the rapid growth of portable personal computers, demand for liquid crystal displays has tended to increase, and at the same time, cost reduction of such devices has been demanded. Especially, cost reduction for expensive color filters has increasingly been demanded. Namely, desired are excellent quality color filters, which are produced at high yield, employing a short production process, and said production method thereof. However, those, which meet with requirements, have not yet been realized.

Color filters for liquid crystal display s are prepared by suitably arranging three filters of blue (B), green (G), and red (R) color. one color filter forms each pixel, and the cell size formed by one pixel is approximately (60 to 100 $\mu$m)×(180 to 300 $\mu$m). In order to minimize surface reflection, each pixel cell is surrounded by a partition wall, that is, a black matrix (hereinafter referred to as BM).

Said color filter is a simple structure. However, due to its complicated and lengthy production process, the yield is low which increases the cost. Thus, demanded are high quality color filters having reduced production cost.

The conventional production methods will now be described below.

The first production method of the color filter for liquid crystal display, which is most frequently employed, is a dyeing method.

In said method, a dyeable photosensitive polymer layer is formed on a support substrate. With the use of photolithography, patterning is carried out while matching the filter shape, and the resulting pattern is dyed.

This operation is repeated three times, one for each color, and subsequently a protective layer is provided. Thus a filter, having three colors of B, G, and R is formed.

The second method is a pigment dispersion method. In said method, a photosensitive resinous layer, into which pigments are dispersed, is formed on a support substrate. The resulting layer is subjected to patterning to obtain a monochromatic pattern.

This operation is also repeated three times, once for each color, and subsequently a protective layer is provided. Thus a filter, having three colors of B, G, and R, is formed.

The third method is an electrodeposition method. In this method, a filter pattern is formed on a support substrate, employing an electrode. Subsequently, the resulting support substrate is immersed into an electrodeposition coating composition comprising pigments, resins, and solvents, and a first color is electrodeposited by applying electricity to the electrode. Said operation is again repeated three times, once for each color, and subsequently a protective layer is provided. Thus a filter having three colors of B, G, and R is formed.

The fourth method is a printing method. In this method, pigments are dispersed into a thermohardening resin and printing is carried out on a glass support substrate. Again, said operation is repeated three times, once for each color, and subsequently a protective layer is provided. Thus a filter, having three colors of B, G, and R is formed.

Drawbacks common with conventional methods are as follows. In order to produce three colors of B, G, and R, it is necessary to repeat the process three times, such as spin coating of photosensitive resins, exposure, development, electrodeposition, printing, and the like. Thus, a lot of resources are wasted; due to the lengthy process, staining chances increase; the yield decreases and the cost increases.

Further, since in the electrodeposition method, dyes are deposited on the electrode, it is necessary to electrically connect an electrode pattern. Thus the pattern shape of filters is limited and at present, it is difficult to apply this method to the TFT use.

Still further, in the printing method, for example, in offset printing, ink is transferred twice and the resolution is degraded, and it is difficult to obtain a finely spaced pattern. Further, since the filter surface results in unevenness, a subsequent process to flatten the surface is required.

In order to overcome these drawbacks, color filters, which are prepared employing an ink jet method, are proposed.

This ink jet method is different from conventional methods and is a method in which each of R, G, and B inks is ejected onto a support substrate from the respective nozzles to form a colored layer. When this method is employed, the required amount of ink can be applied onto a required place at a specific time. Accordingly, there is no waste of ink. Further, since colored layers of R, G, and B are formed simultaneously, the production process is shortened, and it is possible to markedly reduce cost.

However, when a colored layer is formed by ejecting ink onto a pixel forming area (hereinafter occasionally referred to as a convex section) which is formed on the support substrate, employing said ink jet method, the support substrate, which is different from cloth and paper, does not absorb ink. As a result, the ink floods from one pixel (one concave section), and tends to mix with the ink in the adjacent pixel (the concave section).

Further, when physical parameters, such as surface tension, viscosity, and the like of the employed ink, are not adaptable to the surface free energy of the support substrate, the colored layer is repelled. As a result, the thickness of the filter layer loses its uniformity and the color density also tends to not be uniform and white spot marks or ink-omitted spots, where an ink could not be applied due to some defects, tend to form. Further, the surface of the colored layer tends to be roughened, and problems occur in which the layer is incapable of being brought into uniform contact with the liquid crystal layer.

Since the ink jet method is highly efficient and minimizes material waste compared to the conventional methods, it is possible to produce color filters at low cost. However, as described above, the ink in the concave sections tends to mix with that in adjacent concave sections and the ink density (the ink concentration) in the concave sections loses its uniformity. Particularly, big problems occur in which white spot marks tend to form due to lack of ink in parts of concave sections or in the boundary between the concave and convex sections.

In order to overcome the stated drawbacks, it is desirous that the ink, which is ejected onto one of concave sections, does not flow into adjacent concave sections while spreading across the surface of the black matrix area (hereinafter occasionally referred to as the convex section) so that the ink in one concave section does not mix with that in adjacent concave sections.

Further, it is desirous that the ink in the concave sections spreads uniformly.

In order to overcome the stated drawbacks, the surface of the support substrate is treated so that the convex section is ink-repellent while the concave section is ink-affinitive. However, the concave section, having ink affinity, is surrounded by the convex sections having ink repellency. As a result, even though ink spreads uniformly in the concave section, the ink is repelled in the area in contact with the convex section. Thus problems occur in which the color density at the periphery of the concave section decreases, and the contrast of displayed color images is degraded due to the tendency of formation of white spot marks.

As noted above, in order to manufacture filters employing the ink jet method, the treatment that a support substrate (a glass substrate) is treated in order to be accurately and minutely divided into ink-repellent areas and ink-affinitive areas, has been conducted in many prior arts.

For example, Japanese Patent Publication Open to Public Inspection Nos. 9-230123, 7-35916, and 4-123005 disclose methods to form color filters as follows. A photosensitive material and a material such as fluorine-contained resins and silicone-contained resins, which is capable of forming a low energy surface, are multilayered onto a support substrate, and the coating is subjected to irradiation of ultraviolet rays through a pattern matching concave sections or convex sections, and developed to remove the fluorine-contained resins or silicone-contained resins from the concave sections while remaining those in convex sections, onto which ink is ejected to form said color filters.

Since in said method, a photolithographic technique is employed, it is possible to correctly provide ink affinity and ink repellency to each of the concave sections and convex sections. However, dye density tends to decrease due to ink repellency at the boundary between the concave section and the convex section, and the contrast of displayed images tends to decrease due to the formation of white spot marks.

Further, since the glass surface of the concave section has high surface free energy, ink affinity is excellent. However, fluorine or silicone-contained materials having low surface energy tend to be adsorbed onto the surface of the concave section, and thus ink affinity in the concave section tends to be lost.

Due to that, it is necessary to remove applied materials by etching the glass surface in the concave section, using hydrofluoric acid, lasers, and the like.

Further, when fluorine-contained resins, as well as silicone-contained resins, exist in the convex section, it is impossible to apply the protective layer due to their repellency. Therefore, it is necessary to remove them. Then, the process becomes markedly complex due to the additional steps.

There are methods other than this which can be considered. For example, Japanese Patent Publication Open to Public Inspection Nos. 8-201615, 8-227012, 8-230314, and others disclose a method in which a photosensitive resin is applied onto a support substrate; the resulting coating is subjected to irradiation of ultraviolet rays through a mask which is adjusted to the shape of the convex or concave sections; and mixing of ink between concave sections is minimized utilizing the difference in ink absorbability between the irradiated area and the non-irradiated area. However, it is impossible to provide sufficient difference in ink absorbability due to the presence and non-presence of irradiation and it is also impossible to sufficiently minimize ink mixing. Further, since the ink absorptive layer is provided, a decrease in resolution, as well as an increase in production cost, is caused. This method also includes a markedly complex process due to the many additional steps.

In order to minimize the decrease in ink density and white spot marks in the boundary between the convex sections and the concave sections, several methods are disclosed. For example, Japanese Patent Publication Open to Public Inspection No. 9-127327 discloses a method in which the ink repellency on the side surface of convex sections is slightly lowered.

Still further, Japanese Patent Publication Open to Public Inspection No. 9-258208 discloses a method in which the convex section is comprised of double layers, in which the ink repellency of the lower layer is lower than the upper layer.

In these methods, photopolymers are employed in combination with fluorine-contained compounds. Accordingly, a plurality of processes, which are longthy and complex, are required. Thus these methods are not economically advantageous and also result in waste of resources.

In a method described in Japanese Patent Publication Open to Public Inspection No. 10-115703, color unevenness, as well as lack of color, is minimized by flattening the meniscus shape by decreasing the contact angle at the boundary area by controlling the receding contact angle of the ink droplet to the convex section at no more than 50 degrees. However, the receding contact angle of no more than 50 degrees is not preferred because it is impossible to sufficiently flatten the meniscus due to the high contact angle.

In another method described in Japanese Patent Publication Open to Public Inspection No. 9-329706, the lower portion of a convex section is formed employing hydrophilic silicon oxide while the upper portion of the same is formed employing amorphous silicon having hydrophobicity. This method is not preferred because an expensive apparatus, such as a plasma CVD, is required.

As noted above, when high precision color filters are produced employing the ink jet method, a major challenge is the development of a technique in which a support substrate is treated so that the concave section exhibits ink affinity and the convex section exhibits ink repellency, and further the boundary of the concave section with the convex section does not exhibit marked difference in wettability.

Support substrates for the color filter are preferably prepared by applying resins mixed with carbon black onto a glass surface and by forming convex sections thereon.

Concave sections are preferably formed, for example, on a glass surface. The glass surface has high surface free energy. Accordingly, when adsorbed materials having low surface energy are removed, the glass surface exhibits sufficient wettability without need of special ink affinity treatment.

However, since convex sections are formed employing resins which generally exhibit, for example, a medium range of surface free energy, it is impossible to prevent the convex sectionspreading across movement of a solvent-based ink having especially low surface free energy. Therefore, it is preferably proposed that convex sections are treated with fluorine and silicon compounds which provide low surface free energy so that the convex sections exhibit ink repellency.

Conventional methods utilize a photolithographic technique. Accordingly, it is possible to accurately provide ink-repellent treatment onto the surface of convex sections. However, ink repellency due to marked difference in wettability resulted in the boundary line of the convex sections with the concave sections is not sufficiently minimized.

Further, said photolithographic technique exhibits problems in which various processes such as spin coating, exposure, development, removal of materials adsorbed in concave sections, removal of surface treatment materials, and the like, are required, with a resultant increase in cost.

SUMMARY OF THE INVENTION

An object of the present invention is to overcome a problem in conventional methods, in which it is impossible to efficiently minimize ink repellency which results at the boundary line between convex sections and concave sections.

In the present invention, by treating a support substrate employing an extremely simple method, it is possible to minimize ink-spreading across convex sections, to uniformly spread an ink in a concave section, and to minimize ink repellency which results at the boundary line between the concave sections and the convex sections.

Namely, it is an object of the present invention to provide a problem-free color filter having a uniform color density of ink-tinted layers for liquid crystal displays for color liquid displays, color video cameras, image scanners, personal computers, and the like, and a method to prepare less expensive color filters at higher productivity.

The object of the present invention is achieved employing the following embodiments.

(1-1) A method of manufacturing a color filter having a substrate comprising black matrix sections and image forming sections, comprises:

a step of applying a treatment onto the substrate so as to provide influence to a contact angle between an ink meniscus and the black matrix sections before applying an ink onto the substrate.

(1-2) In the method of (1-1), the treatment is a process to change the contact angle with elapse of time.

(1-3) In the method of (1-2), the method further comprises:

a step of applying an ink onto the image forming sections after the step of applying the treatment.

(1-4) In the method of (1-2), the treatment is a surface treatment employing chemical composition.

(1-5) In the method of (1-2), the treatment is a treatment to lower the contact angle.

(1-6) In the method of (1-2), each of the image forming sections is assigned respectively with a corresponding ink to be applied thereon, the method further comprises:

a step of applying the corresponding ink respectively onto each of the image forming sections.

(1-7) A method of manufacturing a color filter having a substrate comprising black matrix sections and image forming sections, wherein each of the image forming sections is assigned respectively with a corresponding ink to be applied thereon, comprises steps of:

applying a surface treatment onto the substrate with chemical composition which is substantially soluble in an ink; and applying the corresponding ink respectively onto each of the image forming sections.

(1-8) In the method of (1-7), the surface treatment is applied onto both of the black matrix sections and the image forming sections.

(1-9) In the method of (1-4), the chemical composition is a surface active agent.

(1-10) In the method of (1-6), the chemical composition is a surface active agent.

(1-11) In the method of (1-7), the chemical composition is a surface active agent.

(1-12) In the method of (1-9), at least two types of surface active agents each having a perfluoro group are employed as the surface active agent.

(1-13) In the method of (1-10), at least two types of surface active agents each having a perfluoro group are employed as the surface active agent.

(1-14) In the method of (1-11), at least two types of surface active agents each having a perfluoro group are employed as the surface active agent.

(1-15) In the method of (1-9), a surface active agent which is substantially soluble in an ink and a surface active agent which is substantially insoluble in an ink are employed as the surface active agent.

(1-16) In the method of (1-10), a surface active agent which is substantially soluble in an ink and a surface active agent which is substantially insoluble in an ink are employed as the surface active agent.

(1-17) In the method of (1-11), a surface active agent which is substantially soluble in an ink and a surface active agent which is substantially insoluble in an ink are employed as the surface active agent.

(1-18) In the method of (1-15), a surface active agent which is substantially soluble in a solvent of an ink and a surface active agent which is substantially insoluble in a solvent of an ink are employed as the surface active agent.

(1-19) In the method of (1-16), a surface active agent which is substantially soluble in a solvent of an ink and a surface active agent which is substantially insoluble in a solvent of an ink are employed as the surface active agent.

(1-20) In the method of (1-17), a surface active agent which is substantially soluble in a solvent of an ink and a surface active agent which is substantially insoluble in a solvent of an ink are employed as the surface active agent.

(1-21) A method of manufacturing a color filter having a substrate comprising black matrix sections and image forming sections, wherein each of the image forming sections is assigned respectively with a corresponding ink to be applied thereon, comprises steps of:

applying the corresponding ink respectively onto each of the image forming sections, wherein at 30 seconds after applying the ink, an advancing contact angle of the ink on the black matrix sections is not larger than 90° and a receding contact angle of the ink on the black matrix sections is not larger than 40°, and wherein with elapse of time under normal ambient temperature and normal atmospheric pressure, the advancing contact angle is lowered to be not larger than 30° and the receding contact angle is lowered to be not larger than 15°.

(1-22) A method of manufacturing a color filter having a substrate comprising black matrix sections and image forming sections, wherein each of the image forming sections is assigned respectively with a corresponding ink to be applied thereon, comprises steps of:

applying the corresponding ink respectively onto each of the image forming sections, wherein immediately after applying the ink, an advancing contact angle of the ink on the black matrix sections is larger than an advancing contact angle of the ink on the image forming sections, wherein with elapse of time, the advancing contact angle of the ink on the black matrix sections is lowered, and wherein within 2 minutes after applying the ink, the advancing contact angle of the ink on the black matrix sections is lowered to be not larger than an angle larger 10° than the advancing contact angle of the ink on the image forming sections.

(1-23) A method of manufacturing a color filter having a substrate comprising black matrix sections and image forming sections, comprises steps of:

a step of applying a treatment onto the substrate such that, immediately after applying the ink, an advancing contact angle of the ink on the black matrix sections is larger than an advancing contact angle of the ink on the image forming sections, wherein with elapse of time, the advancing contact angle of the ink on the black matrix sections is lowered, and wherein within 2 minutes after applying the ink, the advancing contact angle of the ink on the black matrix sections is lowered to be not larger than an angle larger 10° than the advancing contact angle of the ink on the image forming sections.

(1-24) In the method of (1-21), a surface active agent which is substantially soluble in a solvent of an ink and a surface active agent which is substantially insoluble in a solvent of an ink are employed as the surface active agent.

(1-25) In the method of (1-22), a surface active agent which is substantially soluble in a solvent of an ink and a surface active agent which is substantially insoluble in a solvent of an ink are employed as the surface active agent.

(1-26) In the method of (1-23), a surface active agent which is substantially soluble in a solvent of an ink and a surface active agent which is substantially insoluble in a solvent of an ink are employed as the surface active agent.

(1-27) In the method of (1-24), at least two types of surface active agents each having a perfluoro group are employed as the surface active agent.

(1-28) In the method of (1-25), at least two types of surface active agents each having a perfluoro group are employed as the surface active agent.

(1-29) In the method of (1-26), at least two types of surface active agents each having a perfluoro group are employed as the surface active agent.

(1-30) In the method of (1-3), in the step of applying the ink, the ink is applied by an ink-jet method.

(1-31) In the method of (1-7), in the step of applying the ink, the ink is applied by an ink-jet method.

(1-32) In the method of (1-21), in the step of applying the ink, the ink is applied by an ink-jet method.

(1-33) In the method of (1-22), in the step of applying the ink, the ink is applied by an ink-jet method.

(1-34) In the method of (1-23), in the step of applying the ink, the ink is applied by an ink-jet method.

(1-35) A color filter, manufactured by the method of (1-30).
(1-36) A color filter, manufactured by the method of (1-31).
(1-37) A color filter, manufactured by the method of (1-32).
(1-38) A color filter, manufactured by the method of (1-33).
(1-39) A color filter, manufactured by the method of (1-34).
(1-40) A liquid crystal display, comprises a color filter manufactured by the method of (1-30).
(1-41) A liquid crystal display, comprises a color filter manufactured by the method of (1-31).
(1-42) A liquid crystal display, comprises a color filter manufactured by the method of (1-32).
(1-43) A liquid crystal display, comprises a color filter manufactured by the method of (1-33).
(1-44) A liquid crystal display, comprises a color filter manufactured by the method of (1-34).
(1-45) A liquid crystal display, comprises a color filter manufactured by the method of (1-35).

Further, the above object may be attained by the following preferable embodiments.

(2-1) A production method of a color filter wherein prior to ink application, treatment is carried out, which affects the contact angle between the convex section of a support substrate for a color filter, having convex sections as well as concave sections and the ink meniscus, and varies said contact angle with time.

(2-2) The production method of a color filter described in (2-1), wherein the treatment, which affects the contact angle between said convex section and said ink meniscus, and varies said contact angle with time, is a surface treatment employing chemical compounds.

(2-3) The production method of a color filter described in (2-1), wherein the treatment, which affects the contact angle between said convex section and said ink meniscus, and varies said contact angle with time, is a treatment which lowers said contact angle.

(2-4) A production method of a color filter wherein a support substrate for a color filter, having convex sections as well as concave sections, is subjected to surface treatment employing a chemical compound which affects the contact angle between the convex section and the ink meniscus.

(2-5) A production method of a color filter wherein a support substrate for a color filter is subjected to surface treatment employing a chemical compound which is substantially ink-soluble, and said ink which corresponds to each pixel forming area is applied.

(2-6) The production method of a color filter described in (2-2), (2-4), or (2-5), wherein a chemical compound, which is employed to carry out surface treatment which affects the contact angle between the convex section of a support substrate for a color filter, having convex sections as well as concave sections and the ink meniscus, is a surface active agent.

(2-7) The production method of a color filter described in (2-6), wherein at least two types of surface active agents, having a perfluoro alkyl group, are employed in combination.

(2-8) The production method of a color filter described in (2-6) or (2-7), wherein a support substrate for said color filter is subjected to surface treatment employing a surface active agent which is substantially soluble in an ink droplet, together with a surface active agent which is substantially insoluble in said ink.

(2-9) The production method of a color filter described in (2-8) wherein a support substrate for said color filter is subjected to surface treatment employing a surface active agent which is substantially soluble in a solvent of an ink droplet together with a surface active agent which is substantially insoluble in said solvent of said ink.

(2-10) The production method of a color filter described in (2-9) wherein said surface treatment is carried out so that the ratio of the employed amount of said substantially soluble surface active agent to said substantially insoluble surface active agent is in the range of 1,000:1 to 1:1.

(2-11) The production method of a color filter described in 10. wherein said surface treatment is carried out so that the ratio of the employed amount of said substantially soluble surface active agent to said substantially insoluble surface active agent is in the range of 500:1 to 5:1.

(2-12) In a production method of a color filter of applying an ink onto a support substrate for said color filter, which has convex sections as well as concave sections, a production method of said color filter wherein immediately after ink droplet application (30 seconds after the application of an ink droplet), the advancing contact angle of an ink droplet to the convex section of the support substrate of said color filter is no more than 90 degrees and the receding contact angle of the same is no more than 40 degrees, and after an elapse of time (after 2 minutes at normal temperature and pressure), the advancing contact angle decreases to no more than 30 degrees and the receding contact angle of the same decreases to no more than 15 degrees.

(2-13) In a production method of a color filter of applying an ink onto a support substrate for said color filter, which has convex sections and pixel forming areas, a production method of a color filter wherein the advancing contact angle of an ink droplet to the convex section of the support substrate of said color filter is no more than 90 degrees immediately after ink droplet application (30 seconds after the application of an ink droplet) and the receding contact angle of the same is no more than 40 degrees, and the advancing contact angle after an elapse of time (after 2 minutes at normal temperature and pressure) decreases to no more than 30 degrees and the receding contact angle of the same decreases to no more than 15 degrees.

(2-14) A production method of a color filter wherein the advancing contact angle of an ink droplet to the convex section of a support substrate for said color filter, which has convex sections as well as concave sections is, immediately after ink application, greater than the advancing contact angle of said ink droplet to the surface of said support substrate of pixel forming areas to which said ink is to be applied, decreases with an elapse of time, and within 2 minutes after ink application, decreases to a value or less, which is 10 degrees larger than the advancing contact angle of said ink droplet to the support substrate of said pixel areas.

(2-15) A production method of a color filter wherein said support substrate of a color filter is subjected to surface treatment so that the advancing contact angle of an ink droplet to the convex section of a support substrate for said color filter, which has convex sections as well as concave sections is, immediately after ink application, greater than the advancing contact angle of said ink droplet to the surface of said support substrate of pixel forming areas to which said ink is to be applied, decreases with an elapse of time, and within 2 minutes after ink application, decreases to a value or less, which is 10 degrees larger than the advancing contact angle of said ink droplet to the support substrate of said pixel areas.

(2-16) The production method of a color filter described in any one of (2-12) through (2-15) wherein a support substrate for a color filter is subjected to surface treatment employing a surface active agent which is substantially soluble in an organic solvent in an ink, as well as a surface active agent which is substantially insoluble in said organic solvent in the same.

(2-17) The production method of a color filter wherein a support substrate for said color filter is subjected to surface treatment employing at least two types of surface active agents, both having a perfluoroalkyl group.

(2-18) The production method of a color filter described in any one of (2-1) through (2-17), comprising a coloration process employing an ink jet method.

(2-19) When a color filter, which is characterized in being produced employing the production method described in any one of (2-1) through (2-18), is applied to a liquid crystal display, it is possible to obtain markedly improved images. Further, no image problems occur due to use of said color filter and the resulting unit provides excellent performance.

DETAILED DESCRIPTION OF THE PREFERRED EMBODIMENTS

The present invention will now be detailed below.

Surprisingly, in the present invention, it was discovered that it is not required to apply a coating employing a photolithographic technique while differentiating convex sections and concave sections, and based on an approach different from the conventional, it is required to only apply a surface treatment employing chemical composition, preferably, a surface active agent, more preferably, at least one ink-soluble surface active agent, one preferably having a perfluoroalkyl group, onto a support substrate, such as a glass substrate, on which concave sections and convex sections are formed, and whereby, white spot marks are effectively minimized. In this case, convex sections preferably comprise ink repelling compounds such as fluorine-contained compounds.

In the present invention, onto a substrate on which convex sections and concave sections are formed, a required process is to conduct only a surface treatment employing at least two surface active agents having, for example, a perfluoroalkyl group, which preferably exhibit different solubility in the ink, for example, to simply conduct coating onto a glass substrate. Thus, it is not required to apply a coating separately onto convex sections and concave sections with a photolithographic method. Thus, problematic operations such as application of photosensitive resins, mask exposure, and development are not essential.

Namely, as an example of a method of the surface treatment employing at least two surface active agents having different solubility in the ink, there may be listed up a method of coating a surface active agent bonded with, for example, a perfluoroalkyl group as well as a long chain olelypophilic group, which are readily soluble in an organic solvent provided in the ink, and a surface active agent bonded to a perfluoroalkyl group as well as a hydrophilic group which is barely soluble in the organic solvent, provided in the ink, onto a support substrate individually or in combination.

In a coating composition, employed are solvents such as water, alcohol, and the like, as well as various types of other solvents, as desired. Preferably employed coating methods include dip coating, spin coating employing a rotation coating unit, and the like.

The mechanism of the present invention is not fully understood. However, the present inventors understand as follows.

It may be supposed that if a color filter is manufactured by subjecting the substrate to a surface treatment with chemical composition having solubility in an ink and by adhering an ink onto the substrate, the chemical composition on the substrate shifts to an ink droplet phase with elapse of time, thereby lowering the surface tension of the ink droplet itself. Further, it may be considered that, by the above phenomenon, the contact angle of the ink onto the substrate becomes small, the wettability of the ink for the substrate becomes high, and then the ink gradually become adaptable to the surface of the substrate.

That is, immediately after an ink adheres onto the substrate, the ink receives the influences of the impact and the oscillation of the ink droplet when the ink hits on the substrate. However, immediately after the ink hits on the substrate, since the ink has a large contact angle, the ink is prevented from riding across the black matrix and from shifting into the region of the neighboring pixel owing to the impact and the oscillation of the ink droplet when the ink hits on the substrate. From when a reservoir of the ink applied in each pixel becomes stable after the ink adheres on the substrate, the shift of the chemical composition into the ink droplet is started. Thereafter, with elapse of time, the ink droplet becomes adaptable in the pixel on the substrate and the thickness of the ink layer in pixels in the thickness-wise direction of the substrate can be unified.

As a result, it may be considered that the color mixing of the inks among neighboring pixels can be prevented, the ink uniformity in the pixels or the uniformity of the thickness of the ink can be enhanced, and the adaptability of the ink to the black matrix can be enhanced. Whereby, white spot marks in the vicinity of pixels can be prevented.

Next, the mechanism in the case that the substrate is subjected to the surface treatment by using chemical composition easily soluble in the ink and the chemical composition less soluble in the ink will be explained with an example of the case that each of the chemical compositions easily soluble and less soluble in the ink is a surface active agent.

Since surface active agents, which are readily soluble in the organic solvent provided in an ink, are highly olelypophilic, they tend to be adsorbed onto the highly olelypophilic resin surface of the convex sections rather than the highly hydrophilic glass surface of the concave sections. On the other hand, since the surface active agents, which are barely soluble in the organic solvent provided in the ink, is highly hydrophilic, they tend to be adsorbed onto the glass surface of the concave sections rather than the convex sections.

As a result, differences in characteristics of the surface active agents and the substrate are realized, and each of the surface active agents having different properties are selectively adsorbed onto either of the convex sections or the concave sections and the resulting adsorption ratio becomes different. Thus it is possible to spontaneously control the absorption by the differences in surface properties. As a result, it is understood that without carrying out conventional problematic patterning, the convex sections exhibit high ink repellency, while the concave sections exhibit low ink repellency.

Further, a feature is exhibited in which being different from the conventional methods, wettability does not vary markedly in the boundary between the convex sections and the concave sections.

The treatment, as described in the present invention, includes a treatment such as coating of compositions prepared by dissolving chemical compounds and the like, and other treatments such as evaporation, spattering, glow discharge, and the like, which forms materials on the surface.

The substantial insolubility of the chemical composition such as surface active agents, as described in the present invention, is to be interpreted that the solubility of the chemical composition such as surface active agents is less than 0.1 present. The substantial solubility of the chemical composition such as surface active agents, as described in the present invention, is to be interpreted that the solubility of the chemical composition such as surface active agents is not less than 0.1 present.

In the case of using an active agent easily soluble and an active agent less soluble, it may be preferable that the employed ratio of the highly soluble surface active agent to the barely soluble one is made to be (highly soluble surface active agent)/(barely soluble surface active agent)=1,000/1 to 1/1.

However, said range is more preferably between 500/1 and 5/1. BY making the ratio to be not larger than 1,000, the following matter may be prevented. The contact angle rapidly decreases immediately after the application of an ink droplet. Ink mixing between concave sections tends to occur. On the other hand, by making the ratio to be not larger than 1, the following events may be prevented. After the application of a droplet, the contact angle tends not to decrease with an elapse of time, and a decrease in color density. Formation of white spot marks in the periphery of the concave section tends to occur.

Even though ink ejected onto a concave section overflows from the concave section and flows onto a convex section, it is estimated that since a highly hydrophobic surface active agent, which is highly soluble in organic solvents, is adsorbed onto the convex sections in such a manner that the perfluoroalkyl groups are oriented outside and adsorbed on the surface, the advancing contact angle of the ink approaches near 90 degrees and thus it is possible to repel the ink.

However, when the method of the present invention is applied, it is estimated that being different from the photolithographic method, the advancing contact angle at the convex section does not exceed the preferred 90 degrees, and thus it is impossible to perfectly prevent the ink from spreading across the convex section.

However, as described below, the movement of an ink droplet largely depends on the receding contact angle. At the time, for example, when the receding contact angle is preferably no more than 40 degrees, it is possible to minimize the movement of the ink droplet which spreads across the convex section even at an advancing contact angle of less than 90 degrees.

On the boundary line between the convex sections and the concave sections, ink is repelled on the side wall of the convex section. Thus the density tends to decrease, resulting in white spot marks being formed. However, over an elapse of time, a surface active agent, which is highly soluble in the organic solvent provided in the ink, is dissolved into the ink from the side wall of the convex section, and decreases the interfacial tension between the side wall of the convex section and the ink. Thus, it is assumed that the meniscus formed at the boundary between the convex section and the concave section varies from a sharp convex shape to a flat convex shape, and at this location, the following matters can be prevented. Lowering the dye density and forming the white spot marks can be prevented.

The elapse of time as stated herein means several minutes after the application of an ink droplet, during which surface active agents applied onto a substrate are dissolved in said ink so that the ink spreads while wetting. It is preferably within 5 minutes, and is more preferably within two minutes. When it takes long time to dissolve surface active agents, the ink tends not to spread due to an increase in viscosity through the volatilization of the solvent.

The advancing contact angle at the convex section, as stated herein, means the angle formed between the side wall of the convex section which is located in the droplet moving direction by an external force and the ink meniscus. On the other hand, the receding contact angle, as stated herein, means the angle formed between the side wall of the convex section, which is located opposite the droplet moving direction, and the ink meniscus.

Several minutes after ink application, the advancing contact angle at the convex section decreases to no more than 30 degrees, and thus the angle formed between the side wall of the convex section in the droplet moving direction and the ink meniscus varies from a sharp convex shape to a flat shape. Accordingly, it is estimated that the following events can be prevented at said area. Lowering the dye density and forming the white spot marks due to a decrease in the ink layer thickness can be prevented.

When the advancing contact angle at the convex section decreases to no more than 30 degrees, the ink repellency is weakened, and the ink tends to spread across the convex section. However, it is assumed that at the time, the viscosity of the ink increases due to the volatilization of some of the solvent provided in the ink, and thus the ink is prevented form spreading across the convex section.

Further, at the time, the receding contact angle decreases to no more than 15 degrees. Thus the angle formed between the side wall of the opposite convex section and the ink meniscus also flattens out. Accordingly, it is assumed that the following events can be prevented in this area. Lowering the dye density and forming the white spot marks can be prevented.

A black matrix is a convex section having, for example, a markedly low thickness of about 1 μm, as well as a markedly narrow width of about 10 to about 20 μm. The ink repellency treatment method of the present invention is remarkably simple compared to the photolithographic method. As a result, it is impossible to provide sufficiently strong ink repellency to the convex sections obtained by the photolithographic method. In the present invention, the contact angle of the ink droplet to the convex section does not exceed 90 degrees. Thus it seems to be difficult to sufficiently minimize spreading across the convex section of the ink as well as movement between concave sections. However, herein, it is necessary to consider the movement mechanism of droplets.

Generally, in the absence of an external force, the only force, which acts on a droplet, is gravitational force as well as surface tension. As the droplet becomes smaller, the surface area markedly increases with respect to the weight. Thus, the effect due to the surface tension becomes overwhelmingly greater.

Accordingly, the force, which affects the movement of an ultra minute liquid droplet, injected onto a concave section from an ink jet head, is only comprised of ink surface tension σ. An angle, which is formed between a stationary liquid droplet and a solid surface, is designated as an equilibrium contact angle or simply the contact angle θ. When the liquid droplet is placed unto motion, the equilibrium contact angle θ disappears, and an advancing contact angle θa as well as a receding contact angle θr appears. The magnitude of the surface tension acting on the liquid droplet is expressed by σ cos σa in the liquid droplet advancing direction and σ cos σr in the liquid droplet movement thwarting direction. The advancing contact angle θa is the contact angle of the ink droplet to the surface which is not wetted with said liquid, while the receding contact angle θr is the contact angle of the ink droplet to the surface which has been wetted with said liquid. Therefore, θa>θr is always held.

When a droplet starts moving by an external force, θa as well as θr appears. At the time, the droplet is subjected to a force of θ cos σr—σ cos σa in the droplet movement thwarting direction and this becomes a force to hinder the droplet's movement. The advancing contact angle θa and/or the equilibrium contact angle θ is the contact angle of liquid to the surface which is not wetted with said liquid. Therefore, in many cases, θa≈θ holds true.

A droplet, which has both a large advancing contact angle θa and a large receding contact angle ζr, is repelled and forms a spherical shape, and tends to readily move as a rolling sphere. Accordingly, in order to hinder droplet movement, a system is preferred in which a droplet, having large-advancing contact angle θa as well as small receding contact angle θr, is formed.

In the treatment method of the present invention, it is assumed that it is impossible to increase the advancing contact angle of the ink droplet to the convex section to at least 90 degrees. However, by decreasing the receding contact angle, it is possible to hinder the droplet's movement. Even when the advancing contact angle is no more than 90 degrees, it is possible to minimize spreading across the convex section of the ink droplet immediately after droplet application, if the receding contact angle is 40 degrees or less.

Further, the advancing contact angle, as well as the receding contact angle, affects the angle of the side wall of the convex section with respect to the ink meniscus.

When the advancing contact angle, as well as the receding contact angle decreases, said angle decreases. Thus the meniscus shape flattens out and the thickness of a dye layer becomes uniform.

When the advancing contact angle decreases to 30 degrees or less and the receding contact angle decreases to 15 degrees or less, the meniscus shape becomes sufficiently flat, and it is possible to minimize the decrease in color density, as well as to minimize white spot marks due to the decrease in the thickness of the dye layer at the boundary between the convex sections and the concave sections.

The present invention makes it possible to obtain color filters which have not been prepared, and the materials may suitably be selected within the scope of the present invention, while utilizing the relationship between the convex section and the concave section. Depending on said selection, solvents may be organic solvents, water-based solvents, and the ink-jet ink may be water-based or oil-based. For each, materials and surface active agents, which affect contact angle, may be selected. Needless to say, the same applies to the case in which the support substrate is replaced with organic polymer materials and films such as PET and TAC. At any rate, one of the technical concept of the present invention is that in the production of color filters employing an ink jet system, an ink, which is to form pixels, is spread, while controlling the wettability of the ink on the convex section after an elapse of time following the application of the ink droplets.

In the present invention, when the invention described in these claims regarding the contact angle to the convex section is realized, the method is not limited to the treatment employing surface active agents but other methods may also be accepted.

Further, the technical content of the present invention will now be studied in more detail with reference to the relationship with the contact angle of an ink droplet to the concave section (the support substrate surface of a pixel forming area). It was found that the present invention exhibits the greatest feature in which the contact angle of an ink droplet to the black matrix (the convex section) decreases with an elapse of time after ink application. It is possible to describe such an invention in other words. Thus the present invention may be described as follows. Namely, this invention is characterized in that a support substrate for a color filter having convex and concave sections is subjected to surface treatment so that immediately after ink application, the advancing contact angle (the contact angle to the convex section) of an ink droplet to said convex section is greater than the advancing contact angle (the contact angle to the concave section) of said ink droplet to the concave section decreases with an elapse of time, and within two minutes after said ink application, decreases to a value or smaller value, which is greater 10 degrees than the advancing contact angle (the contact angle of an ink droplet to the convex section) of said ink droplet to the support substrate of said image forming area. Further, surprisingly, in many cases, more preferred results are obtained when said decreased value is less than the contact angle of said ink droplet to the concave section. Such preferred results are realized in one embodiment in which a support substrate for a color filter is subjected to surface treatment employing at least two types of surface active agents having different solubility in an ink, and another embodiment in which a support substrate for a color filter is subjected to surface treatment employing at least two types of surface active agents having a perfluoroalkyl group. Further, there may be possibility of other realization means.

Such finding is not obtained by the ink-repellent treatment at the convex section with conventional techniques. The present invention is to provide a method to produce a high quality color filter having neither non-uniformity nor white spot marks by utilizing said effects which are entirely novel.

Namely, in conventional techniques so that said ink tends not to be adhered, it is recommended that the convex sections be subjected to ink-repellent treatment in order to markedly increase the contact angle of an ink composition to said convex section compared to that to the concave section. Accordingly, after ink application, said condition is maintained. Thus it frequently occurs that the supply of said ink droplet to the surroundings of the concave section (the edges of the convex section) tends to be insufficient to result in non-uniform ink filling.

In the present invention, said point is markedly improved. Since after ink application, the ink tends to be wetted with the convex section, especially on its side wall and to be compatible with it, the ink is leveled to form an ink layer having no white spot marks.

At the time, the contact angle of the ink droplet to the convex section is to be less than the value which is 10 degrees greater than the contact angle of said ink droplet to the concave section. Further, it has been confirmed that preferred results are occasionally obtained by positively selecting conditions in which the contact angle of the ink droplet to the convex section is less than the contact angle of said ink droplet to the concave section in accordance with the types of ink as well as the employed surface active agents. The fact that the reversed contact angle is effective is an unexpected finding, and in conventional techniques, no consideration had been made.

Further, it is necessary to apply a protective layer onto the color filter. When a conventional method is employed, the resulting contact angle of an ink droplet to the convex section exceeds 90 degrees. Thus, without removing the layer having strong repellency, it is impossible to apply a protective layer due to mutual repellency. In the present invention, said contact angle is no more than 90 degrees. Thus, without removing the layer having strong repellency, no more strong repellency exists just after coating. Further, said contact angle decreases with an elapse of time, and the surface of the coated protective layer is leveled to form a smoother surface.

In the present invention, prior to the surface active agent treatment, a substrate is preferably washed with pure water and cleaned employing ultraviolet rays, as well as ozone.

Ultraviolet rays have sufficient energy to degrade the chemical bond of organic compounds. Further, ultraviolet rays are capable of generating ozone while employing the ambient oxygen in air. Ultraviolet rays produce unstable materials by pulling off hydrogen atoms from the adhered organic materials, and the resulting unstable materials are subjected to oxidative decomposition in the presence of ozone. Thus it is possible to very effectively remove applied materials.

The concave section is preferably a glass surface which has high surface free energy, and thus exhibits high ink affinity. However, the concave section tends to be adsorbed with materials, especially those having low surface free energy, due to the presence of excessive surface energy, and thus the ink affinity with the surface tends to decrease. Generally, wettability of a solid surface is a phenomenon which relates to a layer having a thickness of several molecules on the solid surface. Thus, when a substance layer having a thickness of several molecules is formed on the surface, wettability is markedly-degraded. It is impossible to remove adsorbed materials having a thickness of several molecules by only washing with pure water. However, when ultraviolet ozone cleaning is employed, it is possible to completely remove said materials adsorbed on the surface of the concave sections employing this markedly simple operation. As a result, the wettability of the concave sections is markedly improved. Thus the concave sections becomes uniformly wettable, and it is possible to improve uniformity of layer thickens as well as even density.

The employed ultraviolet lamp is preferably a low pressure mercury lamp which is capable of radiating ultraviolet rays having a short wavelength of about 200 nm, which can efficiently generate ozone.

The treatment of the present invention, in which surface active agents are applied, occasionally exhibits better results when it is carried out as follows. After forming convex sections (BM) on a substrate, said substrate is subjected to washing with pure water, drying, and ultraviolet ozone cleaning before applying surface active agents. Said drying after washing with pure water may be carried out employing warm air. However, infrared drying provides better results since it tends not to result in uneven drying and the drying time can be shortened.

Further, ultraviolet ozone cleaning is a commonly employed method in this industry. By carrying out such pre-treatment, it is possible to improve the uniformity of surface wettability. Thus it is possible that ink-dying problems after applying surface active agents in the present invention are markedly minimized.

Chemical substances, which are employed for the surface treatment in the present invention, are preferably those having functions represented by surface active agents. For example, listed are phthalic acid ester based compounds, phosphoric acid ester based compounds, surface active agents, and the like. Of these, preferred are the surface active agents.

Said surface active agents employed in the present invention include any type of fluorine based surface active agents, anionic, cationic, and nonionic surface active agents, betaine based surface active agents, and alkyl ether surface active agents, irrespective of low molecular weight as well as high molecular weight, and different types may be employed in combination.

Preferred surface active agents are fluorine-contained surface active agents.

Some specific examples of these are cited below.

Perfluoroalkylcarboxylic acids and salts thereof
Perfluoroalkylphosphoric acid esters
Perfluoroalkyl trimethyl ammonium salts
Perfluoroalkylbetaines
Perfluoroalkylamine oxides
Perfluoroalkylethyl ethylene oxide addition products
Perfluoroaklyl containing oligomers Most preferably employed are combinations of a perfluoroalkylphosphoric acid ester type surface active agent (having a solubility of less than 0.1 percent in the organic solvent in ink such as diethylene glycol monoethyl ether acetate) and a perfluoroalkyl containing oligomer type surface active agent (having a solubility of at least 0.1 percent in the organic solvent in ink, such as diethylene glycol monoethyl ether acetate).

Preferably employed as organic solvents employed in the ink of the present invention are those of imidazolidine derivatives, polyhydric alcohol derivatives, diethylene glycol monoethyl ether acetate, and the like.

The support substrates employed in the present invention, when a black matrix is comprised of resins, are preferably glass substrates such as non-alkali glass and the like. However, the present invention is not limited to these. Depending on the black matrix materials, it is possible to use resin substrates such as TAC (triacetate cellulose film), PET, PEN (polyethylene-naphthalate), and acrylic resin substrates. Flexible substrates are preferably employed for light-weight display units having curved surfaces. Glass substrates are preferably employed due to their excellent dimensional stability.

In the present invention, the black matrix is preferably formed employing, for example, black carbon containing resins. Preferably employed as resins are negative type or positive type photosensitive resins known in the art. For example listed are photo-crosslinking based photosensitive resin compositions, photopolymerizable resin compositions, diazo compound containing photosensitive compositions, o-quinone diazide compound containing photosensitive compositions, and the like. Listed as binder resins are cyclized rubber, various types of vinyl copolymer resins and acrylic series copolymer resins such as polyacrylate, polymethacrylate, novolak resins, phenol resins, and the like.

EXAMPLES

The present invention will now be specifically described with reference to examples. However, the embodiments of the present invention are not limited to these examples.

Example 1

The convex section as well as the concave section on a practical color filter are very small, and thus it is impossible to measure contact angles on the actual filter. Therefore, test support substrate were prepared in which a convex section, that is, a black matrix was provided on the entire support substrate. After washing said support substrate having the black matrix with pure water, the support substrate was treated with surface active agents. Then, an ink droplet was placed on the resulting support substrate and advancing and receding contact angles as well as variations of the contact angle with time were measured.

Specifically, a 1 mm thick non-alkali glass plate was subjected to spin coating to obtain a thickness of 1 μm employing a composition prepared by mixing a negative type photosensitive resin (OMR83 of Tokyo Oka Co., Ltd.) with carbon black. The entire surface of the resulting coating was irradiated with ultraviolet rays and subsequently developed. Thereafter, hardening was carried out at 100° C. for 30 minutes.

The resulting support substrate was dipped into a mixed solution of 0.3 percent ethanol solution of Surface Active Agent 1 (hereinafter occasionally referred to as Active Agent 1), which is readily soluble in the solvent, diethylene glycol monoethyl ether acetate in an ink and 0.02 percent ethanol solution of Surface Active Agent 2 (hereinafter occasionally referred as Active Agent 2), which is barely soluble in the solvent, diethylene glycol monoethyl ether acetate in the ink, and subsequently pulled out of the solution and dried. Herein, employed as Active Agent 1 was Surflon S-381 manufactured by Asahi Glass Co., Ltd. while Surflon S-112 also manufactured by Asahi Glass Co., Ltd. was employed as Active Agent 2.

Measurements of Advancing and Receding Contact Angles

Measurements were carried out employing a contact angle meter CA-X manufactured by Kyowa Kaimen Kagaku Co., Ltd. Employing a syringe, a 5 micro-liter ink droplet, comprising pigments, a photo-polymerizing oligomer, a photo-polymerization initiator, and an organic solvent (diethylene glycol monoethyl ether acetate), was placed on the support substrate. Further, a small amount of the ink is supplied from the syringe to subject the droplet on the support substrate to further spread slightly. Then the advancing contact angle was measured.

Immediately after measurement, a small amount of the ink was drawn up with the syringe to allow the droplet to retreat, and the receding contact angle was measured. Said measurement was carried out 30 seconds after the application of the droplet on the support substrate.

TABLE 1

| | | To Black Matrix | |
|---|---|---|---|
| | | Advancing contact angle | Receding contact angle |
| Active Agent 1 (0.3%) Treatment | 0.5 minute after placement | 23° | 15° |
| | 2.0 minutes after placement | 15° | 11° |
| Active Agent 2 (0.02%) Treatment | 0.5 minute after placement | 73° | 65° |
| | 2.0 minutes after placement | 70° | 68° |
| Active Agent 1 (0.3%) + Active Agent 2 (0.02%) Treatment | 0.5 minute after placement | 81° | 35° |
| | 2.0 minutes after placement | 22° | 10° |

The contact angle of the ink droplet to the convex section of the support substrate treated only with Active Agent 1, which was readily soluble, decreased down to 23 degrees 0.5 minute after ink placement, during which Active Agent 1 was dissolved into the ink. On comparison with the treatment using Active Agent 1 and Active Agent 2, since the rate of decrease was fast, ink mixing between the concave sections tended to occur on comparison with the treatment using Active Agent 1 and Active Agent 2, however, the ink mixing can be appreciably improved on comparison with the treatment using only Active Agent 2. Also, it was possible to minimize white spot marks.

The contact angle of the ink droplet to the convex section of the support substrate treated only with Active Agent 2, which was barely soluble, did not decrease even two minutes after ink placement due to the fact that Active Agent 2 was not dissolved in the ink. Thus the meniscus of the ink at the side wall of the convex section took on a sharp convex form. As a result, a decrease in color density as well as formation of white spot marks tended to occur.

The convex section of the support substrate, treated with the combination of Active Agents 1 and 2 at a ratio of 15:1, exhibited an advancing contact angle of 81 degrees 0.5 minute after ink placement. In order to minimize mixing of the ink between concave sections, the advancing contact angle is preferably at least 90 degrees. However, at the time, the receding contact angle was 35 degrees. Thus the surface tension of the ink acted in the direction thwarting the movement of the ink droplet and no mixing of the ink between the concave sections occurred. Further when two minutes elapsed, the advancing contact angle decreased to 22 degrees, while the receding contact angle decreased to 10 degrees. Thus the ink meniscus became sufficiently flat and neither a decrease in color density nor formation of white spot marks occurred in this area.

Measurements of Variation of Contact Angles with Time

The advancing and receding contact angles are-measured by advancing and retreating a liquid droplet. Therefore, it is impossible to accurately measure the variation of the contact angle with time after placement of the droplet. The variation of the contact angle with time was measured employing a contact angle meter CA-W manufactured by Kyowa Kaimen Kagaku Co., Ltd. In this apparatus, after forming a droplet to be measured on a solid surface, the enlarged image of the droplet is stored in memory at definite time intervals. Based on the stored images, variation of the contact angle with-time was measured. The contact angle measured herein corresponds to the advancing contact angle, and as described above, generally, is approximately the same as the equilibrium contact angle (or the static contact angle).

Figure 1:
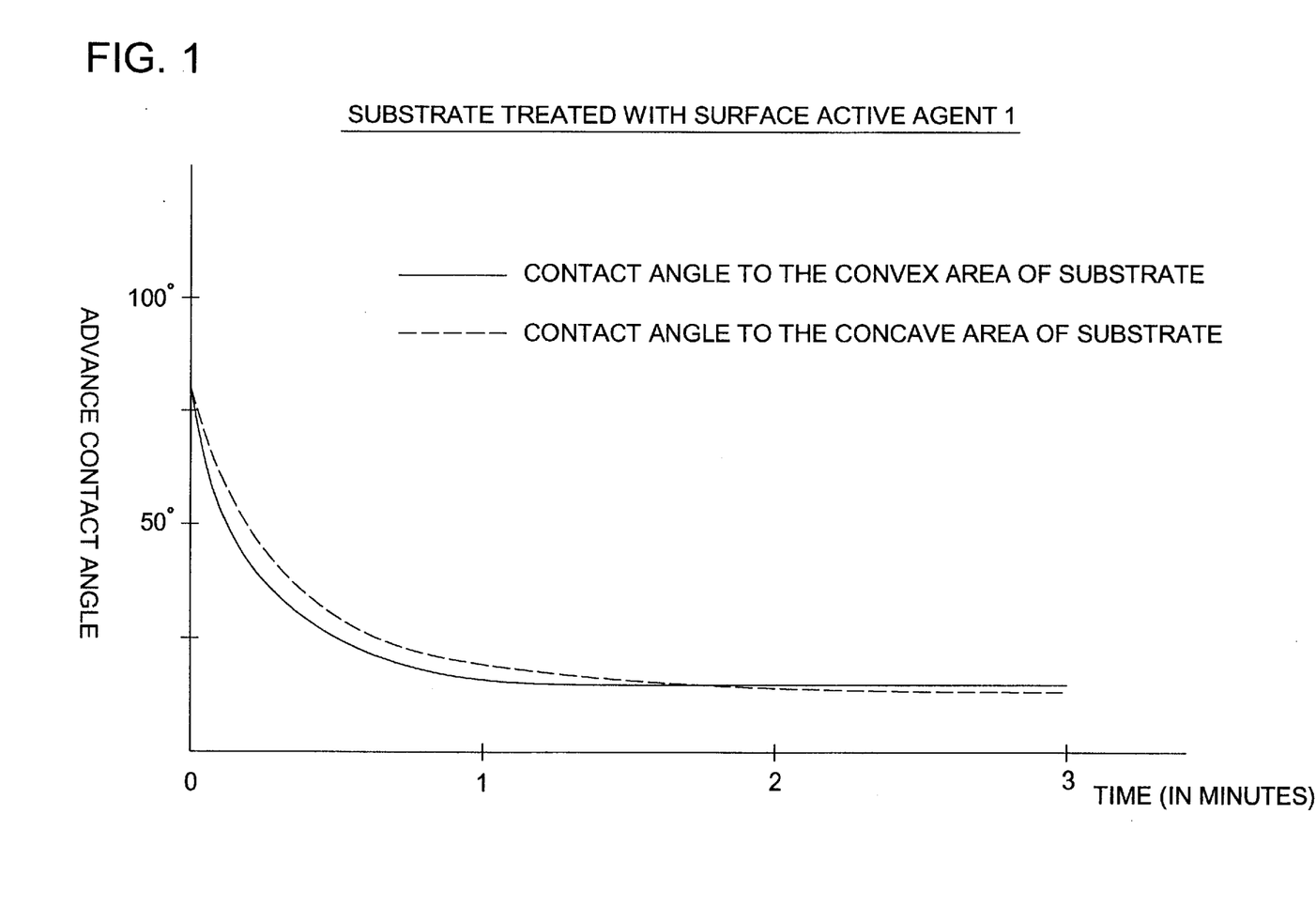
FIG. 1 is a graph showing the change of contact angle of an ink droplet to the convex section as well as the concave section with respect to time on a substrate which is treated with a surface active agent (1) readily soluble in an ink solvent.
Figure 2:
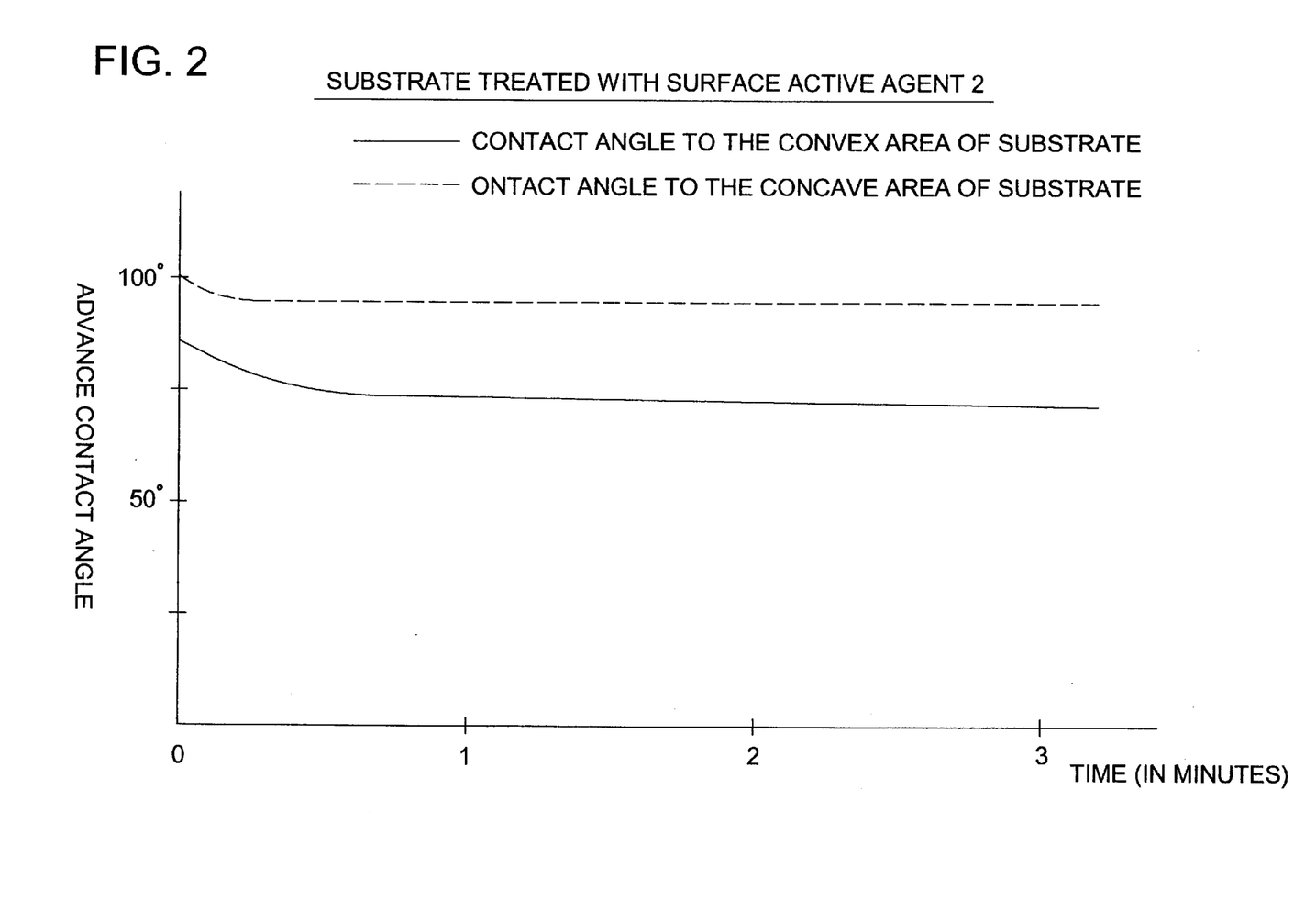
FIG. 2 is a graph showing the change of contact angle of an ink droplet to the convex section as well as the concave section with respect to time on a substrate which is treated with a surface active agent (2) barely soluble in an ink solvent.
Figure 3:
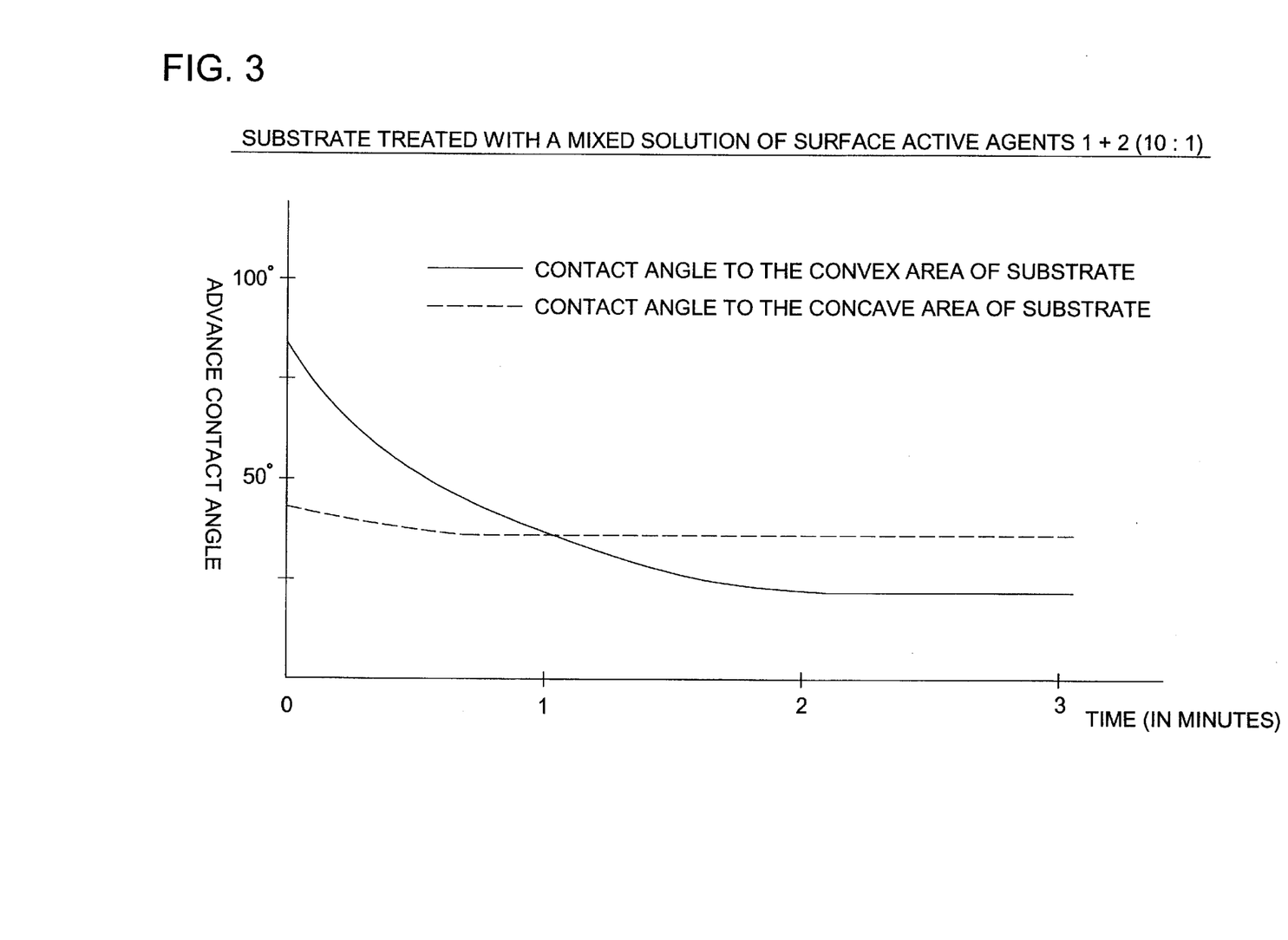
FIG. 3 is a graph showing a case in which a surface active agent (1), which is readily soluble in a solvent in an ink and one (2) which is barely soluble in the same, are mixed at a ratio of 10:1.

FIGS. 1, 2 and 3 show variations of advancing contact angles of an ink droplet to the black matrix-applied glass support substrate which is treated with surface active agents of the present invention.

FIG. 1 is a graph showing the variation of contact angle of an ink droplet to both convex and concave sections with time on a support substrate which is treated with Active Agent 1 (S-381) which is readily soluble in an ink. solvent. There is almost no difference between the convex and concave sections immediately and after application of said droplet. Further, both values decrease rapidly. Due to that, during production of color filters, good uniformity within a pixel is obtained and white spot marks can be appreciably prevented. Further, since the ink has a large contact angle immediately after the ink is dropped, color mixing among neighboring pixels can be greatly reduced.

FIG. 2 shows the case in which the treatment is carried out employing only Active Agent 2 (S-112) which is barely soluble in said ink solvent. In this case, the contact angle at the concave section exceeds the one in the convex section immediately after placement of the ink droplet. Further, the value is large and ink-repellency is excessive. Thus the ink does not uniformly adhere to the pixel in the convex section, and partial repellency as well as unevenness occurs.

FIG. 3 shows the case in which treatment is carried out employing a solution prepared by mixing Active Agent 1 and Active Agent 2 at a mixing ratio of 10:1. The contact angle at the convex section is sufficiently greater than that at the concave section, and further shows more gradual decreasing curve than FIG. 1. It is estimated that color mixing between adjacent pixels is sufficiently minimized. In the present case, the contact angle at the convex section is smaller than that at the concave section. Due to that, it is estimated that the ink is sufficiently adaptable with the convex section. Employing such phenomena, it is possible that the ink is uniformly applied around the pixel without forming white spot marks.

Example 2

Employing a composition prepared by mixing a negative type photosensitive resin (OMR83 of Tokyo Oka Co., Ltd.) with carbon black, 1 mm thick non-alkali glass plate was subjected to spin coating to obtain a 1 $\mu$m thick layer. The resulting plate was subjected to pattern exposure and development, and a support substrate having convex sections as well as concave sections was obtained. The resulting support substrate was hardened at 100° C. for 30 minutes, and thereafter, was dipped into a mixed solution of 0.3 percent Active Agent 1 ethanol solution and 0.02 percent Active Agent 2 ethanol solution, and subsequently pulled out of the solution and dried. Further, as an comparative example, another support substrate was dipped in only ethanol containing no agent, and subsequently pulled out of the solution and dried.

By employing an ink jet printer having a piezoelectric head, 15 droplets of R ink (having 13.2 cp and $2.84 \times 10^{-4}$ N/cm), 15 droplets of B ink (having 13 cp and $2.92 \times 10^{-4}$ N/cm), and 18 droplets of G ink (having 12.7 cp and $2.45 \times 10^{-4}$ N/cm) were ejected at the ratio of said number of droplets onto a $60 \times 220$ $\mu$m cell. After drying, hardening was carried out employing ultraviolet rays. Thus a three-color filter was prepared.

The prepared color filter had an average thickness of 1 $\mu$m and an average transmission density of 0.1. Layer thickness deviation as well as density deviation, and the number of defective pixels containing lack of color were measured.

TABLE 2

| | Layer Thickness Deviation max-min (in $\mu$m) | Standard Deviation of Transmission Density | Number of Defective Pixels Containing Lack of Color |
|---|---|---|---|
| Support Substrate Treated with Active Agent 1 | 0.08 | 0.001 | 35/cm$^2$ |
| Support Substrate Treated with Active Agent 2 | 0.32 | 0.013 | 50/cm$^2$ |
| Support Substrate Treated with Active Agents 1 + 2 | 0.03 | 0.001 | 3/cm$^2$ |
| Comparative Example | 0.38 | 0.015 | 150 or more/cm$^2$ |

In the color filter formed on the support substrate which was treated only with Active Agent 1, the ink spread sufficiently and uneven thickness of the layer as well as uneven density was minimized. Further, on comparison with Comparative Example, defective pixels caused by ink mixing among neighboring pixels could be reduced. Also, it was possible to minimize white spot marks.

In the color filter formed on the support substrate which was treated only with Active Agent 2, the ink did not spread sufficiently and uneven thickness of the layer as well as uneven density was pronounced. There were many defective pixels due to ink repellency.

In the color filter formed on a support substrate which was treated with Active Agent 1 together with Active Agent 2, the uneven layer thickness as well as the uneven density was minimized and the number of defective pixels was extremely small.

Example 3

Employing a composition prepared by mixing a positive type photosensitive resin (FPR800 of Tokyo Oka Co., Ltd.) with carbon black, a 1 mm thick non-alkali glass plate was subjected to spin coating to obtain a 1 $\mu$m thick layer. The resulting plate was subjected to pattern exposure and development, and a support substrate, having convex sections as well as concave sections, was obtained. The resulting support substrate was hardened at 100° C. for 30 minutes. Then, the hardened support substrate was subjected to spin coating of a solution in which the mixing ratio of Active Agent 1 (barely soluble in ink) to Active Agent 2 (readily soluble in ink) was varied at 600:1, 150:1, and 1:1., and subsequently dried.

By employing an ink jet printer having a piezoelectric head, 22 droplets of R ink (having 13.2 cp and 2.84×10$^{-4}$ N/cm), 22 droplets of B ink (having 13 cp and 2.92×10$^{-4}$ N/cm), and 27 droplets of G ink (having 12.7 cp and 2.45×10$^{-4}$ N/cm) were ejected at the ratio of said number of droplets onto a 60×220 $\mu$m cell. After drying, hardening was achieved by employing ultraviolet rays. Thus a three-color filter was obtained.

Said prepared color filter had an average thickness of 1.5 $\mu$m and an average transmission density of 0.15. Layer thickness deviation, unevenness of the color density, and the number of defective pixels containing lack of color were measured.

TABLE 3

| Barely Soluble Surface Active Agent: Readily Soluble Surface Active Agent | Layer Thickness Distribution max-min (in $\mu$m) | Standard Deviation of Transmission Density | Number of Defective Pixels Containing Lack of Color |
| --- | --- | --- | --- |
| 600:1 | 0.08 | 0.003 | 5/cm$^2$ |
| 150:1 | 0.03 | 0.001 | 2/cm$^2$ |
| 1:1 | 0.05 | 0.002 | 3/cm$^2$ |

Example 4

With the similar manner as that in Example 2, glass support substrates having concave sections and convex sections were prepared.

The support substrates were dipped in 0.1% ethanol solution of Surflon S-381 manufactured by Asahi Glass Co., Ltd., in 0.1% ethanol solution of Surflon S-393 manufactured by the same manufacturer, a mixed solution of 0.02% ethanol solution of Surflon S-381 and 0.08% ethanol solution of Surflon S-393 and a ethanol containing no active agent respectively, and subsequently removed them from the solutions and dried.

By employing an ink jet printer having a piezoelectric head, 20 droplets of R ink (having 8.3 cp and 3.13×10$^{-4}$ N/cm), 20 droplets of B ink (having 8.1 cp and 3.04×10$^{-4}$ N/cm), and 20 droplets of G ink (having 8.9 cp and 3.02×10$^{-4}$ N/cm) were ejected at the ratio of said number of droplets onto a 80×240 $\mu$m cell. After drying, hardening was carried out employing ultraviolet rays. Thus a three-color filter was prepared.

Each of the two types of active agents used in the present Example is soluble by the concentration of 0.1% or more in diethylene glycol monoethyl ether acetate which is a solvent of the ink used in the present Example.

The prepared color filter had an average thickness of 1.1 $\mu$m and an average transmission density of 0.12. Layer thickness deviation as well as density deviation, and the number of defective pixels containing lack of color were measured.

TABLE 4

| | Layer Thickness Deviation max-min (in $\mu$m) | Standard Deviation of Transmission Density | Number of Defective Pixels containing Lack of Color |
| --- | --- | --- | --- |
| Support substrate Treated with Surflon S-381 | 0.06 | 0.002 | 13/cm$^2$ |
| Support substrate Treated with Surflon S-393 | 0.08 | 0.003 | 22/cm$^2$ |
| Support substrate Treated with Surflon S-393 + Surflon S-381 | 0.07 | 0.002 | 15/cm$^2$ |
| Support substrate Treated with No Active Agent | 0.43 | 0.38 | >150 |

As can be seen from above results, a color filter having the excellent uniformity and the excellent finished quality can be obtained by using only the active agent of the present invention soluble in the ink or by using the combination of the active agents of the present invention.

In the case of 150:1, which was in the preferred range for combination, a filter, which had minimized problems, was obtained.

The present invention discloses a high quality color filter for color liquid crystal displays, color video cameras, image scanners, and personal computers, and a producing method of the same. According to the present invention, it is possible produce a high quality color filter which minimizes ink mixing between pixel cells, uneven density in the interior of said pixel cells, and a decrease in color density as well as white spot marks at the boundary of said pixels cell while reducing production cost, and employing a markedly simple simple method compared to conventional ones.

What is claimed is:

1. A method of manufacturing a color filter having a substrate comprising black matrix sections and image forming sections, comprising:
    a step of applying a treatment onto the substrate so as to change a contact angle with elapse of time between an ink meniscus and the black matrix sections before applying an ink onto the substrate.

2. The method of claim 1, further comprising:
a step of applying said ink onto the image forming sections after the step of applying the treatment.

3. A The method of claim 2, wherein in the step of applying the ink, the ink is applied by an ink-jet method.

4. A color filter, manufactured by the method of claim 3.

5. A liquid crystal display, comprising
a color filter manufactured by the method of claim 4.

6. A liquid crystal display, comprising
a color filter manufactured by the method of claim 3.

7. The method of claim 1, wherein the treatment is a surface treatment employing a chemical composition.

8. The method of claim 7, wherein the chemical composition is a surface active agent.

9. The method of claim 8, wherein at least two types of surface active agents each having a perfluoro group are employed as the surface active agent.

10. The method of claim 8, wherein a surface active agent which is substantially soluble in an ink and a surface active agent which is substantially insoluble in an ink are employed as the surface active agent.

11. The method of claim 10, wherein a surface active agent which is substantially soluble in a solvent of an ink and a surface active agent which is substantially insoluble in a solvent of an ink are employed as the surface active agent.

12. The method of claim 1, wherein the treatment is a treatment to lower the contact angle.

13. The method of claim 1, wherein each of the image forming sections is assigned respectively with a corresponding ink to be applied thereon, the method further comprises:
a step of applying the corresponding ink respectively onto each of the image forming sections.

14. The method of claim 13, wherein the chemical composition is a surface active agent.

15. The method of claim 14, wherein at least two types of surface active agents each having a perfluoro group are employed as the surface active agent.

16. The method of claim 14, wherein a surface active agent which is substantially soluble in an ink and a surface active agent which is substantially insoluble in an ink are employed as the surface active agent.

17. The method of claim 16, wherein a surface active agent which is substantially soluble in a solvent of an ink and a surface active agent which is substantially insoluble in a solvent of an ink are employed as the surface active agent.

18. A method of manufacturing a color filter having a substrate comprising black matrix sections and image forming sections, wherein each of the image forming sections is assigned respectively with a corresponding ink to be applied thereon, comprising steps of:
applying a surface treatment onto the substrate with chemical composition which is substantially soluble in an ink; and
applying the corresponding ink respectively onto each of the image forming sections.

19. The method of claim 18, wherein the surface treatment is applied onto both of the black matrix sections and the image forming sections.

20. The method of claim 18, wherein the chemical composition is a surface active agent.

21. The method of claim 20, wherein at least two types of surface active agents each having a perfluoro group are employed as the surface active agent.

22. The method of claim 18, wherein in the step of applying the ink, the ink is applied by an ink-jet method.

23. A color filter, manufactured by the method of claim 22.

24. A liquid crystal display, comprising
a color filter manufactured by the method of claim 22.

25. A method of manufacturing a color filter having a substrate comprising black matrix sections and image forming sections, wherein each of the image forming sections is assigned respectively with a corresponding ink to be applied thereon, comprising steps of:
applying a surface treatment onto the substrate with a surface active agent which is substantially soluble in the ink and a surface active agent which is substantially insoluble in the ink; and
applying the corresponding ink respectively onto each of the image forming sections.

26. The method of claim 25, wherein the surface active agent which is substantially soluble in the ink is substantially soluble in a solvent of the ink and the surface active agent which is substantially insoluble in the ink is substantially insoluble in a solvent of the ink.

27. A method of manufacturing a color filter having a substrate comprising black matrix sections and image forming sections, wherein each of the image forming sections is assigned respectively with a corresponding ink to be applied thereon, comprising steps of:
applying the corresponding ink respectively onto each of the image forming sections,
wherein at 30 seconds after applying the ink, an advancing contact angle of the ink on the black matrix sections is not larger than 90° and a receding contact angle of the ink on the black matrix sections is not larger than 40°, and wherein with elapse of time under normal ambient temperature and normal atmospheric pressure, the advancing contact angle is lowered to be not larger than 30° and the receding contact angle is lowered to be not larger than 15°.

28. The method of claim 27, further comprising a step of applying a surface treatment onto the substrate with a surface active agent which is substantially soluble in a solvent of an ink and a surface active agent which is substantially insoluble in a solvent of an ink before applying the corresponding ink.

29. The method of claim 28, wherein each surface active agent has a perfluoro group.

30. The method of claim 27, wherein in the step of applying the ink, the ink is applied by an ink-jet method.

31. A color filter, manufactured by the method of claim 30.

32. A liquid crystal display, comprising
a color filter manufactured by the method of claim 30.

33. A method of manufacturing a color filter having a substrate comprising black matrix sections and image forming sections, wherein each of the image forming sections is assigned respectively with a corresponding ink to be applied thereon, comprising steps of:
applying the corresponding ink respectively onto each of the image forming sections,
wherein immediately after applying the ink, an advancing contact angle of the ink on the black matrix sections is larger than an advancing contact angle of the ink on the image forming sections,
wherein with elapse of time, the advancing contact angle of the ink on the black matrix sections is lowered, and wherein within 2 minutes after applying the ink, the advancing contact angle of the ink on the black matrix sections is lowered to be not larger than an angle larger 10° than the advancing contact angle of the ink on the image forming sections.

34. The method of claim 33, further comprising a step of applying a surface treatment onto the substrate with a surface active agent which is substantially soluble in a solvent of an ink and a surface active agent which is substantially insoluble in a solvent of an ink before applying the corresponding ink.

35. The method of claim 34, wherein each surface active agent has a perfluoro group.

36. The method of claim 33, wherein in the step of applying the ink, the ink is applied by an ink-jet method.

37. A color filter, manufactured by the method of claim 36.

38. A liquid crystal display, comprising
a color filter manufactured by the method of claim 36.

39. A method of manufacturing a color filter having a substrate comprising black matrix sections and image forming sections, comprising steps of:

a step of applying a treatment onto the substrate such that, immediately after applying an ink, an advancing contact angle of the ink on the black matrix sections is larger than an advancing contact angle of the. ink on the image forming sections, wherein with elapse of time, the advancing contact angle of the ink on the black matrix sections is lowered, and wherein within 2 minutes after applying the ink, the advancing contact angle of the ink on the black matrix sections is lowered to be not larger than an angle larger than 10° than the advancing contact angle of the ink on the image forming sections.

40. The method of claim 39, wherein the treatment is applying a surface treatment onto the substrate with a surface active agent which is substantially soluble in a solvent of the ink and a surface active agent which is substantially insoluble in a solvent of the ink are employed as the surface active agent.

41. The method of claim 40, wherein each surface active agent has a perfluoro group.

42. The method of claim 39, wherein in the step of applying the ink, the ink is applied by an ink-jet method.

43. A color filter, manufactured by the method of claim 42.

44. A liquid crystal display, comprising
a color filter manufactured by the method of claim 42.

* * * * *